United States Patent Office 3,299,047
Patented Jan. 17, 1967

3,299,047
PROCESS FOR PURIFYING VERNAMYCIN C
Miklos Bodanszky, Princeton, and John Timothy Sheehan, Middlesex, N.J., assignors, by mesne assignments, to E. R. Squibb & Sons, Inc., New York, N.Y., a corporation of Delaware
No Drawing. Filed Aug. 14, 1963, Ser. No. 301,988
2 Claims. (Cl. 260—239.3)

This invention relates to new chemical compounds and more particularly to a new compound called vernamycin C, having the formula:

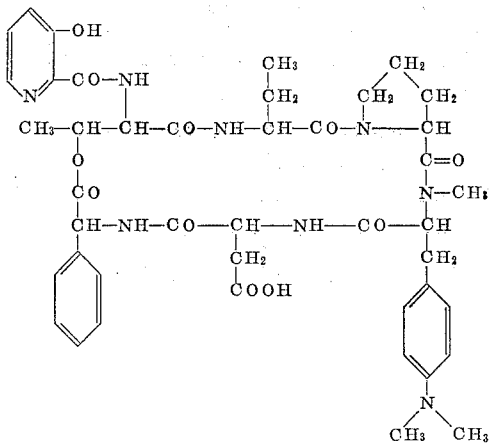

and salts thereof with both bases and acids.

In U.S. Patent No. 2,990,325, granted June 27, 1961, there is described a process for preparing two new groups of antibiotics, named therein as vernamycin A and vernamycin B. These antibiotics are formed by culturing the microorganism *Streptomyces loidensis* ATCC 11415 in a nutrient medium, filtering the broth obtained thereby, extracting the broth filtrate with a water-immiscible organic solvent, such as chloroform, concentrating the organic solvent (e.g., chloroform) extract, and adding another organic solvent, such as hexane, to precipitate a mixture of the vernamycins. The precipitate is then extracted with another organic solvent, such as n-butanol, whereby the vernamycin A is separated whereas the vernamycin B components remain in solution. The vernamycin A precipitate is filtered off and the organic solvent (e.g., butanol) solution is concentrated and treated with still another organic solvent, such as n-hexane, to precipitate the vernamycin B components. The patent also teaches the further purification of the vernamycin B components by slurrying the vernamycin B precipitate in an organic solvent, such as butanol, adding another organic solvent, such as hexane, and recovering the precipitate of purified vernamycin B.

It has now been found that if this general procedure is followed, a third antibiotic is formed which is present principally in the purified vernamycin B. This new antibiotic is named herein vernamycin C and has the structural formula given hereinbefore. It differs from the vernamycin B components in that aspartic acid replaces the 4-eto-pipecolic acid present in the vernamycin B components. As shown in Example 1 following, vernamycin C can be separated from vernamycin B by dissolving the purified vernamycin B in a warm lower alkanol (e.g., methanol at a temperature of about 30° C. to about 60° C.), cooling the solution to precipitate the vernamycin B and concentrating the lower alkanol (e.g., methanol) mother liquor to yield a precipitate of crude vernamycin C.

Vernamycin C can be further purified by countercurrent distribution consecutively in two two-phase systems of solvent, one composed of toluene, methanol and water in the ratio of 4:3:1, and the other composed of toluene, chlorofrom, methanol and water in the ratio of 5:5:8:2, as more fully described in the following Example 1.

Vernamycin C shows good biological activity against gram positive organisms. Its minimal inhibiting concentration against *Staph. aureus* 209P strain is 2.5 γ/ml. It is also active against antibiotic resistant staphylococci. Hence, the new antibotic of this invention, and its salts, can be used in the treatment of diseases caused by gram positive microorganisms in the same manner that known antibiotics which are active against such microorganisms are employed.

To prepare salts of vernamycin C, vernamycin C is slurried in water and the desired acid or base is added. Although any acid or base may be used, the preferred acids and bases are those which form non-toxic salts with vernamycin C. Among such acids may be mentioned inorganic acids, such as the hydrohalic acids (e.g., hydrochloric and hydrobromic acid), sulfuric acid, nitric acid, boric acid and phosphoric acid; and organic acids, such as oxalic, tartaric, citric, acetic and succinic acid. Among such bases may be mentioned inorganic bases, such as the alkali metal hydroxides (e.g., sodium hydroxide and potassium hydroxide); and organic bases, such as primary, secondary and tertiary amines.

The following examples illustrate the invention (all temperatures being in centigrade):

*Example 1.—Preparation of vernamycin C*

(a) *Fermentation.*—The fermentation of *Streptomyces loidensis* ATCC 11415 is carried out as described in Example 3 of U.S. Patent No. 2,990,325. After 38 hours fermentation the broth is filtered with 4% Hy-Flo filter acid and the filter cake is washed with water to obtain a filtrate volume equal to the original broth volume.

(b) *Removal of vernamycin A and vernamycin B.*—Approximately 800 gallons of filtered broth obtained in step (a), at a pH 6.5–7.0, is extracted with one-tenth its volume of chloroform. This extract is concentrated in vacuo to about one liter and the solids which separate are removed by filtration. The filtrate is diluted with five volumes of n-hexane to precipitate a crude product weighing about 300 g.

The crude product is extracted with about 1.5 liters of n-butanol and filtered to remove the insoluble material which contains most of the vernamycin A.

The filtered butanol extract is then diluted with n-hexane until precipitation is complete and about 150 g. of a crude vernamycin B-vernamycin C mixture is recovered. This crude mixture is slurried in 500 ml. of ethyl acetate at 50° and then allowed to cool to room temperature and filtered. The filtrate is extracted with 300 ml. of water, acidified to pH 1.5–2.0 with hydrochloric acid and the resulting aqueous acid extract is neutralized with 40% sodium hydroxide solution. A crude mixture of vernamycin B and vernamycin C settles out.

This crude mixture is dissolved in about 60 ml. of warm methanol (40°) and the resulting solution is cooled to 0° to yield about 15 g. of pure vernamycin B as a precipitate. Concentration to dryness of the methanol mother liquor yields about 15 g. of crude vernamycin C.

(c) *Recovery and purification of vernamycin C.*—The 15 g. of crude vernamycin C obtained in step (b) is dissolved in 120 ml. of the lower phase of a toluene-methanol-water (4:3:1) solvent system and the material is fractionated by countercurrent distribution using the single withdrawal technique until 102 transfers have been made. The contents of the withdrawn fractions from 43–72 and the fundamental series from 14–29 are combined and the solvent evaporated at room temperature in vacuo. The residue, about 4.5 g., is dissolved in 100 ml. of the lower phase mixture of a toluene-chloroform-methanol-water (5:5:8:2) solvent system and placed in tubes 0–9 of a five hundred tube countercurrent apparatus. Distribution is continued until five hundred transfers have been carried out. At this point the contents of tubes 0–90 and 201–500 are withdrawn from the apparatus and replaced with fresh upper and lower phase mixture of the above solvent system. The distribution of the material in tubes 91–200 is then continued by recycling for an additional 1,500 transfers when the contents of the tubes 40–79 are withdrawn and the solvents evaporated under vacuum to give about 321 mg. of vernamycin C which melts at about 170–190° (dec.) $[\alpha]_D^{20}$ —92° (c., 1 methanol).

*Analysis.*—Found C, 60.27; H, 6.34; N, 12.58; N-methyl, 5.83; neutralization equivalent 442 (as base); 466 (as acid).

*Example 2.—Vernamycin C dihydrochloride*

The dihydrochloride salt of vernamycin C can be prepared by slurrying the solid antibiotic in water, adding two equivalents of hydrochloric acid, then freezing and lyophilizing the solution. The hydrochloride salt so prepared is water soluble.

In a similar manner, by substituting any desired acid for the hydrochloric acid in the procedure of Example 2, the corresponding salt is formed.

*Example 3.—Vernamycin C, sodium salt*

The sodium salt of vernamycin C can be prepared by slurrying the solid antibiotic in water, adding an equivalent of sodium hydroxide, then freezing and lyophilizing the solution. The sodium salt so prepared is water soluble.

In a similar manner, by substituting a desired inorganic or organic base for the sodium hydroxide in the procedure of Example 3, the corresponding salt is formed.

This invention may be variously otherwise embodied within the scope of the appended claims.

What is claimed is:

1. A process for isolating vernamycin C from a mixture thereof with vernamycin B, which comprises dissolving said mixture in a warm lower alkanol, cooling the resulting solution to precipitate the vernamycin B, and recovering the vernamycin C from the remaining solution.

2. The process of claim 1, wherein the lower alkanol is methanol.

References Cited by the Examiner
UNITED STATES PATENTS 2,990,325   6/1961   Donovick et al. _____ 167—33

WALTER A. MODANCE, *Primary Examiner.*

ROBERT T. BOND, *Assistant Examiner.*